US012791392B2

(12) United States Patent
Fong et al.

(10) Patent No.: US 12,791,392 B2
(45) Date of Patent: Nov. 10, 2026

(54) SINGLE PHOTON DETECTOR BASED ON THE KINETIC INDUCTANCE OF TWO-DIMENSIONAL VAN DER WAALS MATERIALS

(71) Applicants: RTX BBN Technologies, Inc., Cambridge, MA (US); President and Fellows of Harvard College, Cambridge, MA (US); The Trustees of Columbia University in the City of New York, New York, NY (US)

(72) Inventors: Kin Chung Fong, Concord, MA (US); Leonardo Matteo Ranzani, Acton, MA (US); Mary Kreidel, Cambridge, MA (US); Robert M. Westervelt, Lexington, MA (US); Jesse Balgley, Brooklyn, NY (US); Xuanjing Chu, New York, NY (US); James Curtis Hone, New York, NY (US)

(73) Assignees: RTX BBN TECHNOLOGIES, INC., Cambridge, MA (US); PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 307 days.

(21) Appl. No.: 18/186,092

(22) Filed: Mar. 17, 2023

(65) Prior Publication Data

US 2025/0283763 A1 Sep. 11, 2025

Related U.S. Application Data

(60) Provisional application No. 63/484,475, filed on Feb. 10, 2023.

(51) Int. Cl.
*G01J 5/20* (2006.01)
*H01Q 13/10* (2006.01)

(52) U.S. Cl.
CPC ................ *G01J 5/20* (2013.01); *H01Q 13/10* (2013.01); *G01J 2005/208* (2013.01)

(58) Field of Classification Search
None
See application file for complete search history.

(56) References Cited

U.S. PATENT DOCUMENTS

2015/0293236 A1* 10/2015 Cecil .................... G01T 1/1606 216/13
2019/0086269 A1* 3/2019 Brown .................... G01J 5/046
(Continued)

OTHER PUBLICATIONS

Gao et al. "A titanium-nitride near-infrared kinetic inductance photon-counting detector and its anomalous electrodynamics", Applied Physics Letters 101, 142602 (Year: 2012).*
(Continued)

*Primary Examiner* — Edwin C Gunberg
(74) *Attorney, Agent, or Firm* — CANTOR COLBURN LLP

(57) ABSTRACT

A single photon detector based on the kinetic inductance of two-dimensional Van der Waals materials. In some embodiments, a system including such a detector includes: a resonator including a conductive path through a superconducting sheet, the superconducting sheet being composed of a Van der Waals material, the superconducting sheet being configured to absorb a photon, and in response to the absorption of the photon, to exhibit an increase in a kinetic inductance of the conductive path.

20 Claims, 5 Drawing Sheets

(56) References Cited

U.S. PATENT DOCUMENTS

2021/0083133 A1* 3/2021 Efetov .................. G01J 1/0209
2021/0140833 A1* 5/2021 Efetov ...................... G01J 5/20

OTHER PUBLICATIONS

Notification of Transmittal of the International Search Report and the Written Opinion of the International Searching Authority, or the Declaration; PCT/US2023/080787; Apr. 16, 2024, 14 pages.
Ulbricht et al. "Applications for Microwave Kinetic Induction Detectors in Advanced Instrumentation", Appl. Sci. 2021, 11, x For Peer Review, Nov. 16, 2021, 29 pages.
Yates, et al. "Photon noise limited radiation detection with lens-antenna coupled Microwave Kinetic Inductance Detectors", Arxiv.org, Cornell University Library, Jul. 21, 2011, 4 pages.
Antony, A. et al., "Making high-quality quantum microwave devices with van der Waals superconductors", Journal of Physics: Condensed Matter, Dec. 21, 2021, pp. 1-6, IOP Publishing Ltd.
Baselmans, J.J.A. et al., "A kilo-pixel imaging system for future space based far-infrared observatories using microwave kinetic inductance detectors", Astronomy & Astrophysics, 2017, pp. 1-16, EDP Sciences.
Day, P.K. et al., "A broadband superconducting detector suitable for use in large arrays", Letters to Nature, Oct. 23, 2003, pp. 817-821, vol. 425, Nature Publishing Group.
Day, P.K. et al., "Antenna-coupled microwave kinetic inductance detectors", Nuclear Instruments & Methods in Physics Research, Jan. 4, 2006, pp. 561-563, Elsevier B.V.
Gao, J. et al., "A titanium-nitride near-infrared kinetic inductance photon-counting detector and its anomalous electrodynamics", Applied Physics Letters, Oct. 5, 2012, pp. 142602-1-142602-4, American Institute of Physics.
Gou, W. et al., "Counting near infrared photons with microwave kinetic inductance detectors", Applied Physics Letters, May 22, 2017, pp. 212601-1-212601-5, AIP Publishing.
Seifert, P. et al., "Magic-Angle Bilayer Graphene Nanocalorimeters: Toward Broadband, Energy-Resolving Single Photon Detection", NANO Letters, Apr. 21, 2020, pp. 3459-3464, American Chemical Society.
De Visser, P.J. et al., "Fluctuations in the electron system of a superconductor exposed to a photon flux", Nature Communications, Feb. 5, 2014, pp. 1-8, Macmillan Publishers Limited.
Vissers, M.R. et al., "Ultrastable millimeter-wave kinetic inductance detectors", Applied Physics Letters, Jan. 22, 2020, pp. 032601-1-032601-5, AIP Publishing.
Antony, A., et al. (2021). "Making high-quality quantum microwave devices with van der Waals superconductors". Journal of Physics: Condensed Matter, 34(10), 103001, Nov. 18, 2021, 7 pages.
Day, P. K., LeDuc, H. G., Mazin, B. A., Vayonakis, A., & Zmuidzinas, J. (2003). "A broadband superconducting detector suitable for use in large arrays". Nature |vol. 425 | Oct. 23, 2003, 817-821.
Gao, J., et al. Research Article | Oct. 5, 2012. "A titanium-nitride near-infrared kinetic inductance photon-counting detector and its anomalous electrodynamics". Applied Physics Letters, 101(14), 5 pages.
Guo, W., et al. Research Article | May 22, 2017 (2017). "Counting near infrared photons with microwave kinetic inductance detectors". Applied Physics Letters, 110(21), 6 pages.
Seifert, P., et al., (2020). "Magic-Angle Bilayer Graphene Nanocalorimeters: Toward Broadband, Energy-Resolving Single Photon Detection". Nano Letters, 20(5), pp. 3459-3464.

* cited by examiner

SINGLE PHOTON DETECTOR BASED ON THE KINETIC INDUCTANCE OF TWO-DIMENSIONAL VAN DER WAALS MATERIALS

CROSS-REFERENCE TO RELATED APPLICATION(S)

The present application claims priority to and the benefit of U.S. Provisional Application No. 63/484,475, filed Feb. 10, 2023, entitled "SINGLE PHOTON DETECTOR BASED ON THE KINETIC INDUCTANCE OF TWO-DIMENSIONAL VAN DER WAALS MATERIALS", the entire content of which is incorporated herein by reference.

FIELD

One or more aspects of embodiments according to the present disclosure relate to photon detectors, and more particularly to a single photon detector based on the kinetic inductance of two-dimensional Van der Waals materials.

BACKGROUND

Detectors for detecting low fluxes of electromagnetic radiation in the infrared spectrum have a variety of commercial applications, including imaging applications.

It is with respect to this general technical environment that aspects of the present disclosure are related.

SUMMARY

According to an embodiment of the present disclosure, there is provided a system, including: a resonator including a conductive path through a superconducting sheet, the superconducting sheet being composed of a Van der Waals material, the superconducting sheet being configured to absorb a photon, and in response to the absorption of the photon, to exhibit an increase in a kinetic inductance of the conductive path.

In some embodiments, the system further includes a coupling structure for coupling the photon to the superconducting sheet.

In some embodiments, the coupling structure includes an antenna.

In some embodiments, the antenna is a slot antenna. In some embodiments, the system further includes a measuring circuit for measuring a kinetic inductance of the conductive path.

In some embodiments, the measuring circuit includes a signal source for producing a probe signal at or near a resonant frequency of the resonator.

In some embodiments, the measuring circuit further includes a detecting circuit for measuring a characteristic of the probe signal after interaction with the resonator.

In some embodiments, the detecting circuit includes a mixer for mixing a signal from the signal source with the probe signal after interaction with the resonator.

According to an embodiment of the present disclosure, there is provided a system, including: a plurality of resonators; and a bus transmission line, each of the resonators being coupled to the bus transmission line, a first resonator of the plurality of resonators including a conductive path through a superconducting sheet, the superconducting sheet being composed of a Van der Waals material, the superconducting sheet being configured to absorb a photon, and in response to the absorption of the photon, to exhibit an increase in a kinetic inductance of the conductive path.

In some embodiments, the system further includes a coupling structure for coupling the photon to the superconducting sheet.

In some embodiments, the coupling structure includes an antenna.

In some embodiments, the antenna is a slot antenna. In some embodiments, the system further includes a measuring circuit for measuring a kinetic inductance of the conductive path.

In some embodiments, the measuring circuit includes a signal source for producing a probe signal at or near a resonant frequency of the resonator.

In some embodiments, the measuring circuit further includes a detecting circuit for measuring a characteristic of the probe signal after interaction with the resonator.

In some embodiments, the detecting circuit includes a mixer for mixing a signal from the signal source with the probe signal after interaction with the resonator.

In some embodiments, a second resonator of the plurality of resonators includes a conductive path through a superconducting sheet, the superconducting sheet being composed of a Van der Waals material, the superconducting sheet being configured to absorb a photon, and in response to the absorption of the photon, to exhibit an increase in a kinetic inductance of the conductive path.

In some embodiments, the second resonator has a resonant frequency different from a resonant frequency of the first resonator.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a photon detector provided in accordance with the present disclosure and is not intended to represent the only forms in which some embodiments may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Single photon detectors have a variety of applications. In the range of the electromagnetic spectrum extending from about 600 GHz to about 600 THz, such applications include night vision, biochemistry, thermography, and quantum networking (in which photon counting may be used to detect eavesdropping). In this range of the electromagnetic spectrum relatively few options exist for detecting photons, in part because of the relatively low photon energy in this range of the electromagnetic spectrum.

Figure 1A:
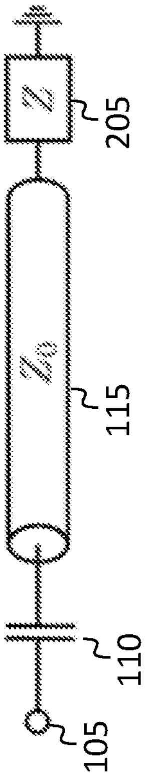
FIG. 1A is a schematic drawing of a resonator, according to an embodiment of the present disclosure.

FIG. 1A shows a quarter-wave transmission line resonator, in some embodiments. The terminal, or "input" of the resonator 105 is connected (e.g., through a capacitor 110) to a quarter-wave transmission line 115, the other end of which is connected, through a series impedance 205 (Z), to ground. The quarter-wave transmission line 115 may have a characteristic impedance $Z_0$. If the series impedance Z is small, then it will be (i) transformed into a high impedance by the quarter-wave transmission line resonator 115 and (ii) coupled to the terminal 105 via the coupling capacitor 110.

Figure 1B:
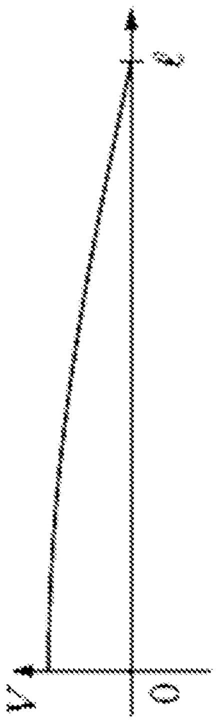
FIG. 1B is a graph of signal amplitude, according to an embodiment of the present disclosure.
Figure 1C:
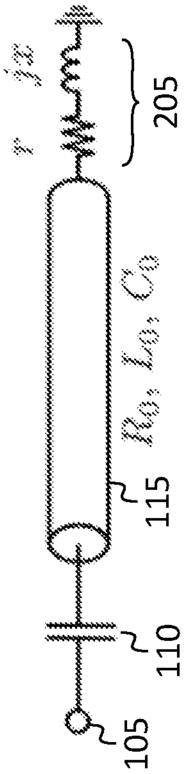
FIG. 1C is a schematic drawing of a resonator, according to an embodiment of the present disclosure.
Figure 1D:
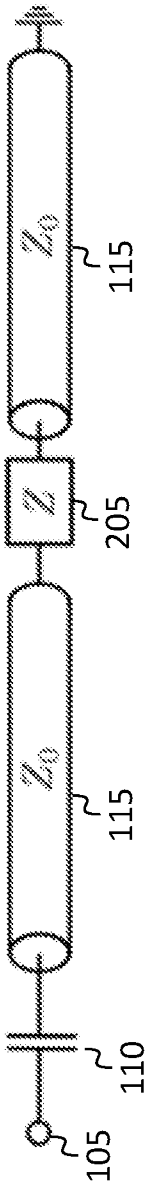
FIG. 1D is a schematic drawing of a resonator, according to an embodiment of the present disclosure.

FIG. 1B shows the magnitude of the voltage as a function of position along the quarter-wave transmission line 115, for the case in which the magnitude of the series impedance Z is zero or small. The magnitude of the voltage is zero (or nearly zero) at the grounded end of the quarter-wave transmission line 115. The magnitude of the current flowing in the quarter-wave transmission line 115 may be greatest at the grounded end of the quarter-wave transmission line 115 (this point may be referred to as a current anti-node) and it may be small (or zero) at the resonator terminal near the coupling capacitor 110. Referring to FIG. 1C, in some embodiments, the series impedance Z may have a resistive component r and a reactive component x, as illustrated by the equivalent circuit shown. FIG. 1D shows a half-wave resonator also having a series impedance Z at the current anti-node, which in the case of the half-wave resonator is in the center, between two quarter-wave sections 115 of transmission line.

Figure 2A:
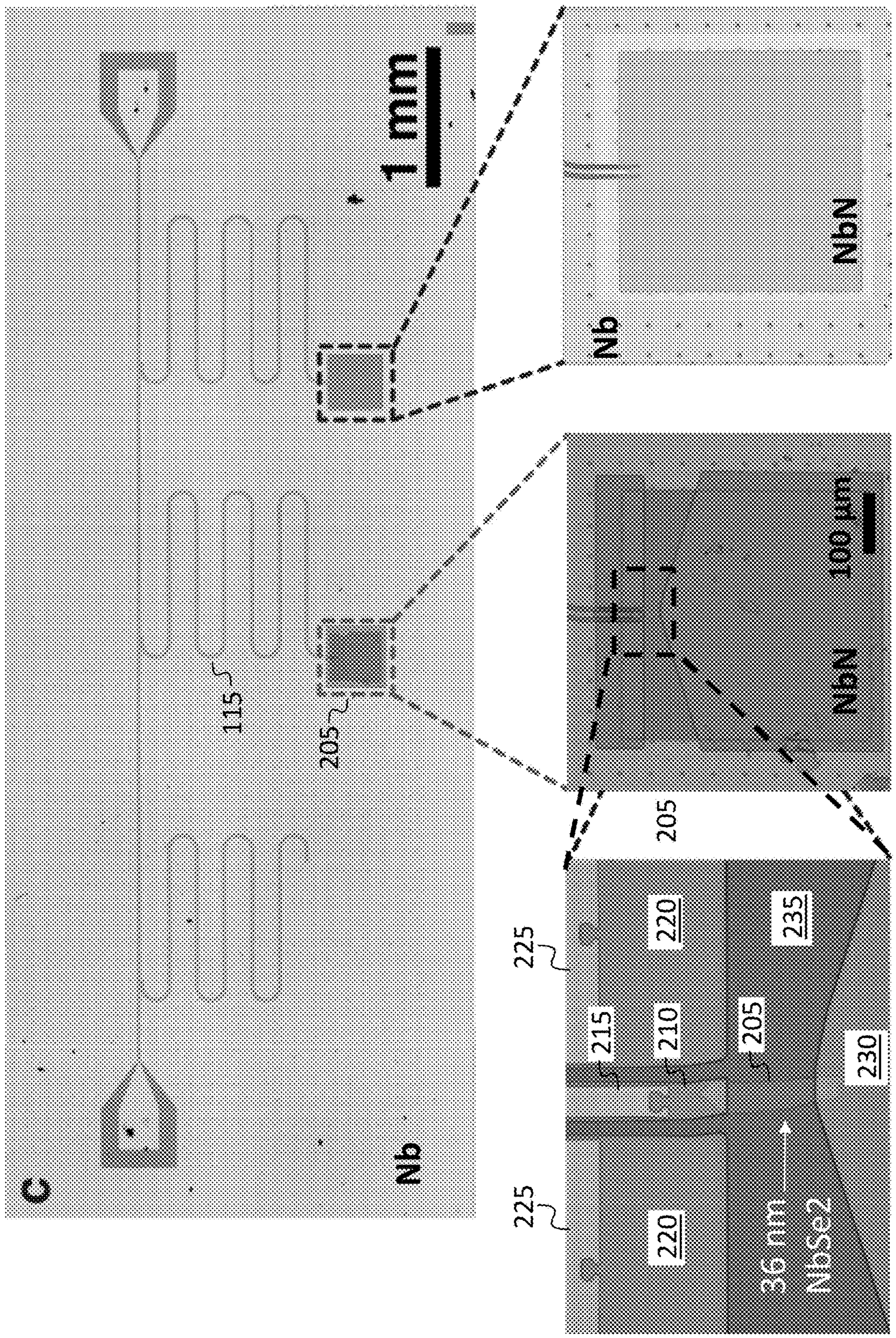
FIG. 2A is a photograph, with enlarged portions, of a system including a resonator, according to an embodiment of the present disclosure.

In some embodiments, the resonator of FIGS. 1A and 1C or the resonator of FIG. 1D is configured to be employed as a photon detector. FIG. 2A shows three resonators, the center one of which includes a quarter-wave transmission line 115, having one end grounded through a series impedance Z. The quarter-wave transmission line 115 may be a superconducting transmission line (e.g., a coplanar transmission line in which both the signal conductor and the ground are superconducting (e.g., composed of a bulk superconductor)). The series impedance Z of the resonator includes a conductive path 205 through a superconducting sheet composed of a Van der Waals material. The enlarged view at lower left in FIG. 2A shows the detailed structure of the conductive path 205 and the surrounding conductors. A connection to a first end of the conductive path 205 is made through a coplanar transmission line which includes a center conductor including a first portion 210 composed of NbN and a second portion 215 composed of niobium. Each of the ground planes of the coplanar transmission line may similarly include a first portion 220 composed of NbN and a second portion 225 composed of niobium. A second end of the conductive path 205 is connected to a patch 230, which may be grounded, and which may be composed of niobium nitride. The conductive patches may be formed on a silicon substrate 235. In operation, the superconducting sheet may absorb a photon (e.g., an infrared photon), which may break the pairs of electrons that form Cooper pairs in the superconducting sheet, causing the electrons to move from the energy gap of the material to above the superconducting gap, increasing the kinetic inductance of the conductive path 205. This increase in kinetic inductance may be detected by a suitable circuit (discussed in further detail below).

Figure 2B:
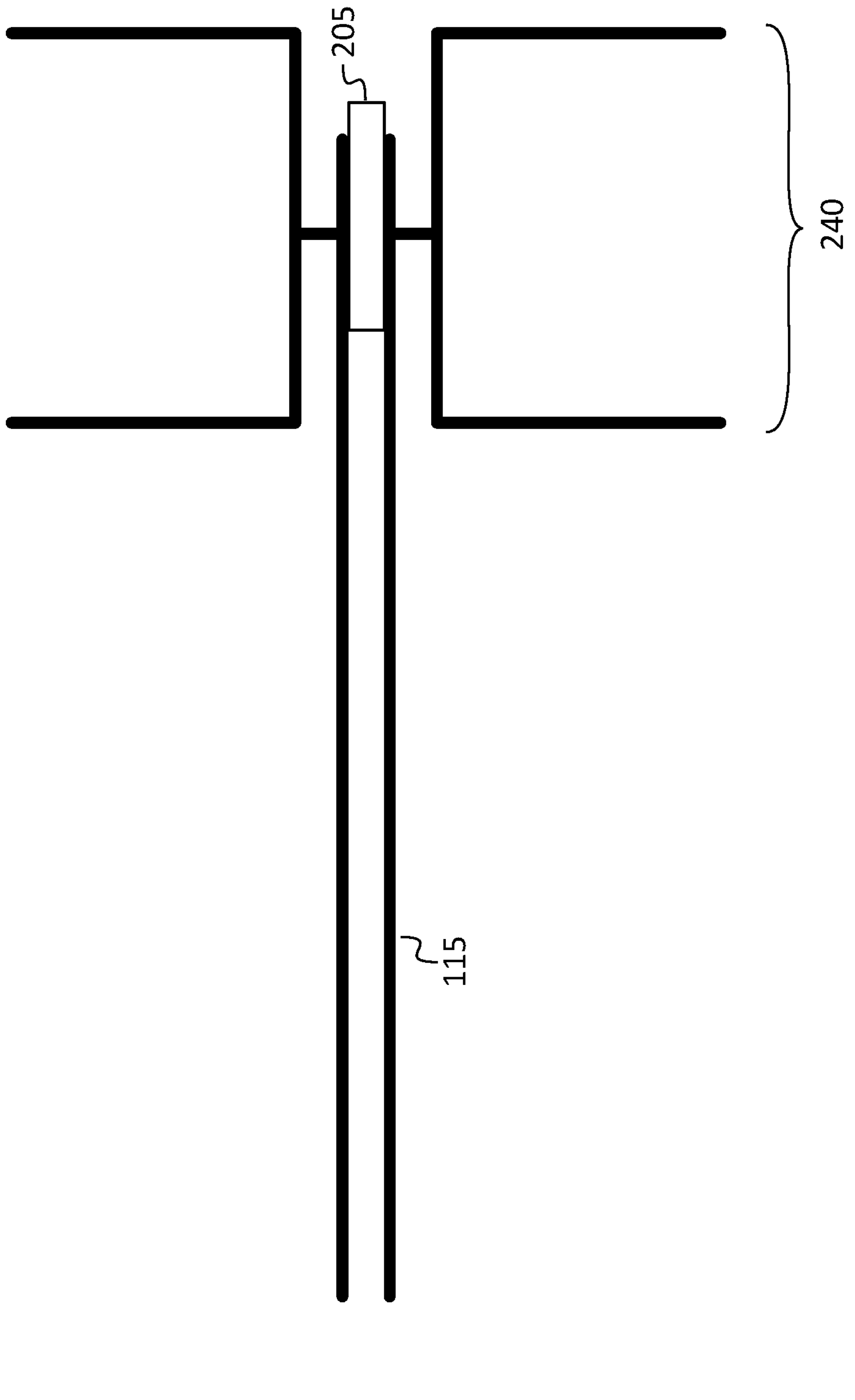
FIG. 2B is a schematic drawing of a portion of a circuit including a slot antenna, according to an embodiment of the present disclosure.

Photons to be detected may be coupled to the conductive path 205 in various ways, e.g., using various coupling structures. Referring to FIG. 2B, in which dark lines represent slots in a conductive sheet, a slot antenna 240 may be used instead, at the end of the quarter-wave transmission line 115 (which may be a coplanar waveguide). In FIG. 2B, the conductive sheet may be composed of one or more superconducting materials, e.g., the center conductor of the coplanar waveguide (except the portion that is part of the conductive path 205) may be composed of aluminum and the surrounding ground plane may be composed of NbTiN. In some embodiments, a lens is used to couple received photons to the conductive path 205 (e.g., the lens may focus the photons directly on the conductive path 205, and similarly a lens array may be used to couple photons to an array of conductive paths 205 in an array of resonators).

For a certain photon energy, the number of electrons that are generated and excited to above the superconducting gap may be inversely proportional to the critical temperature of the superconducting material. The fractional change in the kinetic inductance of the conductive path 205 is larger for a superconductor with a smaller superconducting gap energy. As such, a material with a relatively low critical temperature may be used, to improve the sensitivity of the structure as a photon detector. The kinetic inductance of the conductive path 205, and the change in the kinetic inductance of the conductive path 205, may both be inversely proportional to the charge carrier density (per unit area) which may be significantly higher for a Van der Waals material than for a bulk material. As such, the use of a Van der Waals material may improve the sensitivity of the structure as a photon detector.

Examples of suitable Van der Waals materials include magic angle graphene (MAG), $MoS_2$, $WTe_2$, $MoS_2$, $TaS_2$, $PS_2$, and $NbSe_2$. The thickness of the Van der Waals material may be between 1 and 50 atomic layers. The use of Ta, MoRe, Nb, NbN, and other superconducting alloys to make the transmission line resonator may result in a high-quality-factor resonator and a high-sensitivity kinetic inductance detector readout. The target material for the photon absorption may, as mentioned above, be the Van der Waals materials, represented as "Z" (205) in FIGS. 1A and 1D so that the largest change of kinetic inductance per photon will be produced. The series impedance Z of the resonator in each of FIG. 1A and FIG. 1D is located in the current anti-node of the quarter-wave and half-wave transmission line resonator, respectively. The change of the kinetic inductance may produce the largest change of the resonant frequency at the current anti-nodes.

Figure 3A:
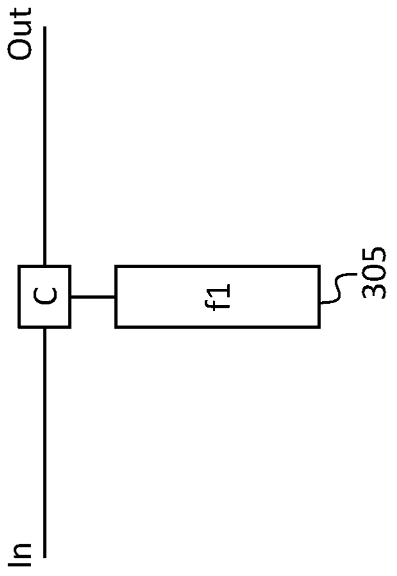
FIG. 3A is a schematic drawing of a resonator coupled to a bus transmission line, according to an embodiment of the present disclosure.

The change in the kinetic inductance of the conductive path 205 (or the resulting change in the resonant frequency of the resonator 305) may be measured, for example, by coupling the resonator 305 to a transmission line (or "bus transmission line") 310 using a suitable coupler 315, as shown in FIG. 3A. A first end of the bus transmission line 310 (which may be referred to as the input of the bus transmission line 310) may then be driven by a probe signal, which may be a radio frequency (RF) signal or a microwave signal at or near the resonance frequency of the resonator

305. The frequency of the probe beam may be selected to be significantly lower than that of the photons being detected. For example, the frequency of the probe beam may be selected to be sufficiently low that the photons of the probe beam have too little energy to break a pair of electrons forming a Cooper pair. The amplitude and phase of the signal transmitted to the output, when the input is driven by the probe signal, may depend on the kinetic inductance of the conductive path 205, and, as such, the absorption of a photon by the superconducting sheet (and the resulting change in the kinetic inductance of the conductive path 205) may cause a change in the amplitude and phase of the signal transmitted to the output, which may in turn be detected by a suitable measuring circuit (discussed in further detail below).

Similarly, the amplitude and phase of the signal reflected back to the input when the input is driven by the probe signal may depend on the kinetic inductance of the conductive path 205, and the absorption of a photon by the superconducting sheet (and the resulting change in the kinetic inductance of the conductive path 205) may cause a change in the amplitude and phase of the signal reflected back to the input, which may in turn be detected by a suitable measuring circuit. The coupler 315 may be any suitable coupler, such as a directional coupler, a power splitter, a tee, or a tee and a series capacitor in series with the leg of the tee that is connected to the resonator 305. In some embodiments the series capacitor is implemented as a short gap between the center conductor of the bus transmission line 310 (which may be a coplanar transmission line) and the quarter-wave transmission line 115 of the resonator 305.

Figure 3B:
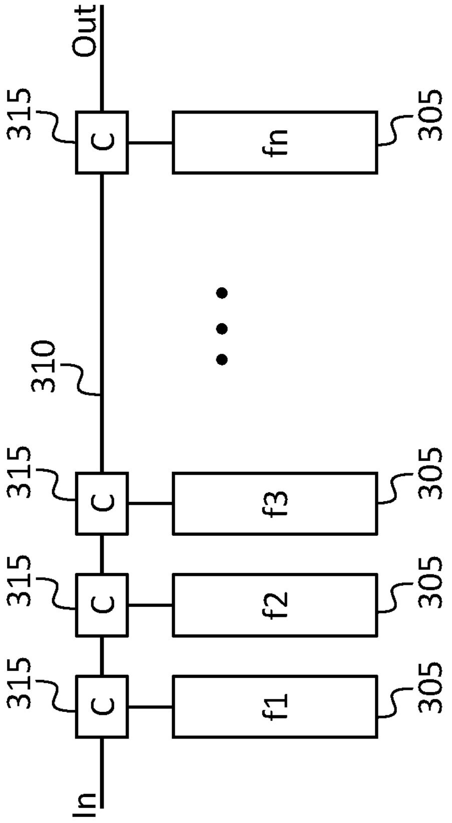
FIG. 3B is a schematic drawing of an array of resonators coupled to a bus transmission line, according to an embodiment of the present disclosure.

Multiplexing of an array of single photon detectors may be performed as follows. FIG. 3B shows an embodiment with an array of resonators 305 (e.g., n resonators 305), all connected to a single bus transmission line 310. The resonators 305 may be constructed such that their resonant frequencies (f1, f2, f3, . . . fn) are non-overlapping, e.g., such that their resonant frequencies are all different. For example, the lengths of transmission line in the resonators 305 may be different, and each resonator 305 may include a section of transmission line that is a quarter-wave transmission line 115 at the respective resonant frequency of the resonator 305. The effect, on the transmitted probe signal and on the reflected probe signal, of a change in the kinetic inductance of the conductive path 205 of any one of the resonators 305 may be greatest at frequencies near the resonant frequency of the resonator 305, and relatively small at frequencies that are not near the resonant frequency of the resonator 305. As such, a circuit that repeatedly, or continuously, measures the amplitude and phase of the transmitted probe signal or of the reflected probe signal at the respective resonant frequency of each of the resonators 305 may be capable of detecting a photon being absorbed by any one of the resonators 305. A multiplexed photon detector such as that illustrated in FIG. 3B may be used to construct an imaging detector, for example.

Figure 4:
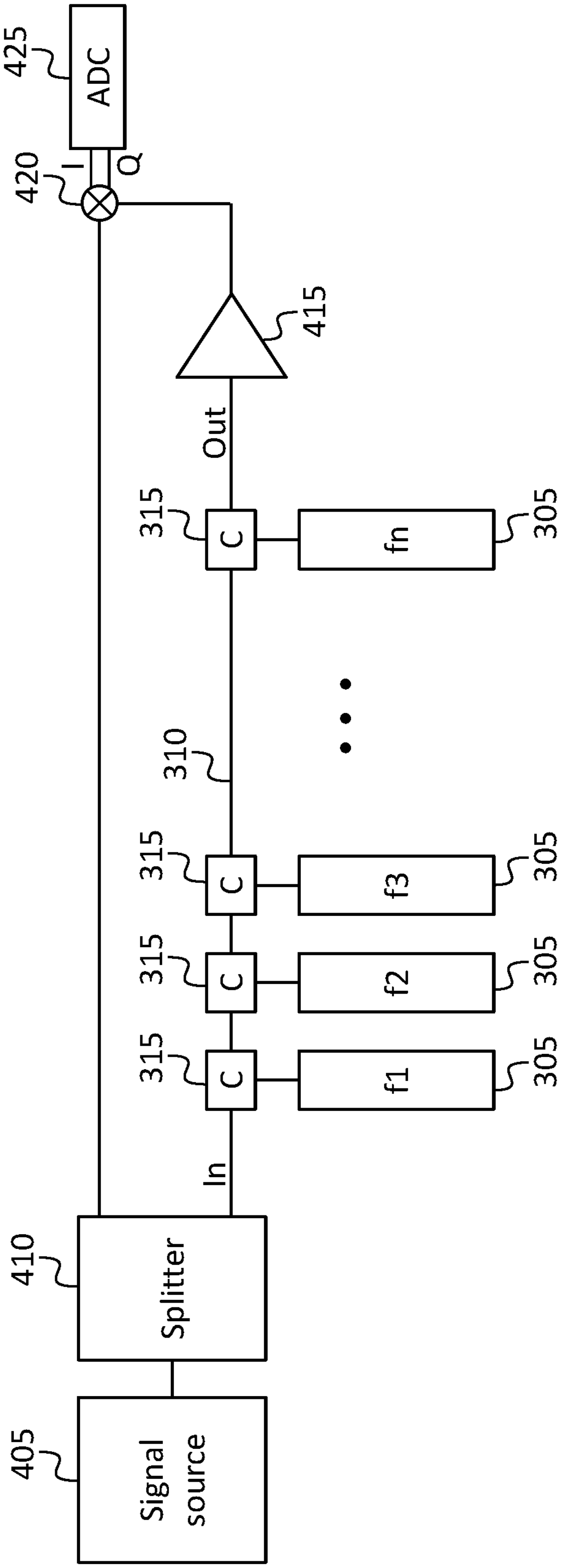
FIG. 4 is a schematic drawing of an array of resonators coupled to a bus transmission line, and a measuring circuit, according to an embodiment of the present disclosure.

FIG. 4 is a schematic drawing of an array photon detector, including an array of resonators 305 each coupled to a bus transmission line 310, and a measuring circuit, in some embodiments. A signal source 405 generates the probe signal, which is split into two portions by a splitter 410. A first portion of the probe signal propagates along the bus transmission line 310 and interacts with the resonators 305. The amplitude and phase of this portion of the probe signal may be affected by the absorption of a photon, in the conductive path 205 through a superconducting sheet of a Van der Waals material, of a resonator 305 having a resonant frequency near the frequency of the probe signal. The first portion of the probe signal is amplified by an amplifier 415 (which may include a first amplifier (e.g., a high electron mobility transistor amplifier operating at low temperature) and a second amplifier (e.g., an amplifier operating at room temperature)) and fed to a mixer 420, where it is mixed with a second portion of the probe signal. The baseband in-phase (I) and quadrature phase (Q) outputs of the mixer may be fed to an analog to digital converter 425, which may digitize the baseband signal so that the amplitude and phase of the transmitted first portion of the probe signal may be calculated. In some embodiments the probe signal includes multiple frequency components, e.g., a tone at or near each of the respective resonant frequencies of the resonators 305, so that detecting of absorbed photons may be performed simultaneously in all of the resonators 305.

As used herein, a material or structure may be said to be "superconducting" if, at sufficiently low temperature, current density, and magnetic field it will be in, or it will transition to, a superconducting state. As used herein, this term ("superconducting") also applies to the structure or material when it is not in a superconducting state. As such, aluminum, or an aluminum electrode, may be referred to as "superconducting", even when it is at room temperature (and not in a superconducting state).

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B.

It will be understood that when a layer is referred to as being "between" two layers, it can be the only layer between the two layers, or one or more intervening layers may also be present. The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items. As used herein, any structure or layer that is described as being "made of" or "composed of" a substance should be understood (i) in some embodiments, to contain that substance as the primary component or (ii) in some embodiments, to contain that substance as the major component.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

It will be understood that when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Although limited embodiments of a photon detector have been specifically described and illustrated herein, many modifications and variations will be apparent to those skilled in the art. Accordingly, it is to be understood that a photon detector employed according to principles of this disclosure may be embodied other than as specifically described herein. Features of some embodiments are also defined in the following claims, and equivalents thereof.

What is claimed is:

1. A system, comprising:
a resonator comprising a conductive path through a superconducting sheet,
the superconducting sheet being composed of a Van der Waals material,
the superconducting sheet being configured to absorb a photon, and
in response to the absorption of the photon, to exhibit an increase in a kinetic inductance of the conductive path.

2. The system of claim 1, further comprising a coupling structure for coupling the photon to the superconducting sheet.

3. The system of claim 2, wherein the coupling structure comprises an antenna.

4. The system of claim 3, wherein the antenna is a slot antenna.

5. The system of claim 1, further comprising a measuring circuit for measuring a kinetic inductance of the conductive path.

6. The system of claim 5, further comprising a coupling structure for coupling the photon to the superconducting sheet.

7. The system of claim 5, wherein the measuring circuit comprises a signal source for producing a probe signal at or near a resonant frequency of the resonator.

8. The system of claim 7, wherein the measuring circuit further comprises a detecting circuit for measuring a characteristic of the probe signal after interaction with the resonator.

9. The system of claim 8, wherein the detecting circuit comprises a mixer for mixing a signal from the signal source with the probe signal after interaction with the resonator.

10. A system, comprising:
a plurality of resonators; and
a bus transmission line,
each of the resonators being coupled to the bus transmission line,
a first resonator of the plurality of resonators comprising a conductive path through a superconducting sheet,
the superconducting sheet being composed of a Van der Waals material,
the superconducting sheet being configured to absorb a photon, and
in response to the absorption of the photon, to exhibit an increase in a kinetic inductance of the conductive path.

11. The system of claim 10, further comprising a coupling structure for coupling the photon to the superconducting sheet.

12. The system of claim 11, wherein the coupling structure comprises an antenna.

13. The system of claim 12, wherein the antenna is a slot antenna.

14. The system of claim 10, further comprising a measuring circuit for measuring a kinetic inductance of the conductive path.

15. The system of claim 14, wherein the measuring circuit comprises a signal source for producing a probe signal at or near a resonant frequency of the resonator.

16. The system of claim 15, wherein the measuring circuit further comprises a detecting circuit for measuring a characteristic of the probe signal after interaction with the resonator.

17. The system of claim 16, wherein the detecting circuit comprises a mixer for mixing a signal from the signal source with the probe signal after interaction with the resonator.

18. The system of claim 17, wherein:
a second resonator of the plurality of resonators comprises a conductive path through a superconducting sheet,
the superconducting sheet being composed of a Van der Waals material,
the superconducting sheet being configured to absorb a photon, and
in response to the absorption of the photon, to exhibit an increase in a kinetic inductance of the conductive path.

19. The system of claim 10, wherein:
a second resonator of the plurality of resonators comprises a conductive path through a superconducting sheet,
the superconducting sheet being composed of a Van der Waals material,
the superconducting sheet being configured to absorb a photon, and
in response to the absorption of the photon, to exhibit an increase in a kinetic inductance of the conductive path.

20. The system of claim 19, wherein the second resonator has a resonant frequency different from a resonant frequency of the first resonator.

* * * * *